(12) United States Patent
Barnett et al.

(10) Patent No.: US 10,552,831 B2
(45) Date of Patent: Feb. 4, 2020

(54) SECURING DATA VIA MULTI-LAYER TOKENS

(71) Applicant: The Toronto-Dominion Bank, Toronto (CA)

(72) Inventors: Jonathan K. Barnett, Oakville (CA); Roy D'Souza, Oakville (CA); John Jong Suk Lee, Waterloo (CA); Christopher Arthur Holland McAlpine, Toronto (CA); Aleksandar Roskic, Toronto (CA); Douglas Edward William Watson, Toronto (CA); Zheng Xi, Toronto (CA); Shannon Rose Yeoman, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 271 days.

(21) Appl. No.: 15/283,861

(22) Filed: Oct. 3, 2016

(65) Prior Publication Data

US 2017/0134168 A1    May 11, 2017

Related U.S. Application Data

(60) Provisional application No. 62/251,664, filed on Nov. 5, 2015.

(51) Int. Cl.
*H04L 9/32* (2006.01)
*G06Q 20/38* (2012.01)
*G06Q 20/40* (2012.01)
*H04L 9/14* (2006.01)
(Continued)

(52) U.S. Cl.
CPC ....... *G06Q 20/3829* (2013.01); *G06Q 20/401* (2013.01); *H04L 9/0861* (2013.01); *H04L 9/14* (2013.01); *H04L 9/30* (2013.01); *H04L 9/3226* (2013.01); *H04L 9/3247* (2013.01); *G06Q 2220/00* (2013.01); *H04L 2209/56* (2013.01)

(58) Field of Classification Search
CPC combination set(s) only.
See application file for complete search history.

(56) References Cited

U.S. PATENT DOCUMENTS

| 6,128,735 A * | 10/2000 | Goldstein ............... H04L 9/088 713/166 |
| 8,036,941 B2 | 10/2011 | Bennett et al. |
| 8,108,303 B2 | 1/2012 | Moran |

(Continued)

*Primary Examiner* — John B King
*Assistant Examiner* — Darshan I Dhruv
(74) *Attorney, Agent, or Firm* — Graham Patent Law (57) ABSTRACT

A message processing server includes a memory and a message processor. The message processor is configured to receive first data; save an identifier in association with a first-layer access restriction indicator and a first key, generate a first encrypted layer by encrypting the first data with the first key, and generate a token from the identifier and the first encrypted layer; receive second data and the token; recover the identifier and the first encrypted layer from the token; confirm that the identifier was saved in the memory in association with the first indicator; save the identifier in association with a second-layer access restriction indicator and a second key, generate a second encrypted layer by encrypting the first encrypted layer and the second data with the second key, and regenerate the token from the identifier and the second encrypted layer.

19 Claims, 5 Drawing Sheets

(51) Int. Cl.
H04L 9/30 (2006.01)
H04L 9/08 (2006.01)

(56) References Cited

U.S. PATENT DOCUMENTS

| | | | |
|---|---|---|---|
| 8,140,442 B2 | 3/2012 | Heyer | |
| 8,363,827 B2 * | 1/2013 | Yap | H04L 9/0643 |
| | | | 380/28 |
| 8,688,594 B2 | 4/2014 | Thomas et al. | |
| 8,914,632 B1 * | 12/2014 | Shankar | H04L 63/101 |
| | | | 713/167 |
| 2006/0123465 A1 * | 6/2006 | Ziegler | G06F 21/33 |
| | | | 726/2 |
| 2006/0282901 A1 * | 12/2006 | Li | G06F 21/606 |
| | | | 726/26 |
| 2007/0283415 A1 * | 12/2007 | Kurita | G06Q 20/341 |
| | | | 726/2 |
| 2008/0244721 A1 * | 10/2008 | Barrus | G06F 21/6254 |
| | | | 726/9 |
| 2014/0344153 A1 * | 11/2014 | Raj | G06Q 20/3821 |
| | | | 705/44 |
| 2015/0249651 A1 * | 9/2015 | Okamoto | H04L 63/08 |
| | | | 713/171 |
| 2015/0262246 A1 * | 9/2015 | Stack | G06Q 10/10 |
| | | | 705/51 |
| 2015/0288663 A1 * | 10/2015 | Watanabe | H04L 63/0428 |
| | | | 380/28 |
| 2015/0379295 A1 * | 12/2015 | Branton | G06F 21/6218 |
| | | | 713/165 |
| 2016/0119296 A1 * | 4/2016 | Laxminarayanan | |
| | | | H04L 63/0428 |
| | | | 713/168 |
| 2016/0294562 A1 * | 10/2016 | Oberheide | H04L 9/3247 |

* cited by examiner

SECURING DATA VIA MULTI-LAYER TOKENS

RELATED APPLICATIONS

This patent application claims the benefit of the filing date of U.S. Patent Application Ser. No. 62/251,664, filed Nov. 5, 2015, the contents of which are incorporated herein by reference.

FIELD OF THE INVENTION

This patent application relates to a method and data structure for securing data.

BACKGROUND

In a high-value financial transaction (e.g. purchase of home, land or business), the buyer may be required to obtain financing (e.g. mortgage, loan) prior to closing the transaction. In order to obtain financing approval, the buyer may be required to provide the lending institution with various forms of sensitive personal information (e.g. date of birth, proof of employment, tax statements) at various stages of the approval process. To allow employees of the lending institution to confirm that the previous stages of the approval process have been completed, the buyer's personal information may be stored in unrestricted form on the lending institution's computer server. As a result, the buyer may have limited technological means to control the dissemination of the buyer's personal information.

SUMMARY

This patent application discloses a message processing server, associated method and data structure that provides for the controlled access to data stored in the data structure.

In accordance with a first aspect of the disclosure, there is provided a message processing server that includes a memory and a message processor.

The message processor is configured to (i) receive a first encryption request including first data; (ii) save a token identifier in the memory in association with a first-layer access restriction indicator and a first cryptographic key, generate a first encrypted data layer by encrypting the first data with the first cryptographic key, and generate a multi-layer token by encrypting the token identifier and the first encrypted data layer; and (iii) return the multi-layer token in response to the first encryption request.

The message processor is configured to (iv) receive a second encryption request including second data and the multi-layer token; (v) recover the token identifier and the first encrypted data layer by decrypting the multi-layer token; and (vi) confirm that the recovered token identifier was saved in the memory in association with the first-layer access restriction indicator.

The message processor is also configured to (vii) save the token identifier in association with a second-layer access restriction indicator and a second cryptographic key, generate a second encrypted data layer by encrypting the first encrypted data layer and the second data with the second cryptographic key, and regenerate the multi-layer token by encrypting the token identifier and the second encrypted data layer; and (viii) return the multi-layer token in response to the second encryption request.

In accordance with a second aspect of the disclosure, there is provided a method of providing controlled access to data that involves a message processor receiving a first encryption request including first data; saving a token identifier in association with a first-layer access restriction indicator and a first cryptographic key, generating a first encrypted data layer by encrypting the first data with the first cryptographic key, generating a multi-layer token by encrypting the token identifier and the first encrypted data layer, and returning the multi-layer token in response to the first encryption request.

The method involves the message processor receiving a second encryption request including second data and the multi-layer token; recovering the token identifier and the first encrypted data layer by decrypting the multi-layer token; and confirming that the recovered token identifier was saved in association with the first-layer access restriction indicator.

The method also involves the message processor saving the token identifier in association with a second-layer access restriction indicator and a second cryptographic key, generating a second encrypted data layer by encrypting the first encrypted data layer and the second data with the second cryptographic key, regenerating the multi-layer token by encrypting the token identifier and the second encrypted data layer; and returning the multi-layer token in response to the second encryption request.

In accordance with a third aspect of the disclosure, there is provided a non-volatile computer-readable that stores a data structure comprising at least one multi-layer token and at least one group of related data records.

Each multi-layer token includes a plurality of encrypted data layers. A first of the encrypted data layers stores first data. A second of the encrypted data layers stores second data and the first encrypted data layer. The first encrypted data layer is encrypted with a first cryptographic key, and the second encrypted data layer is encrypted with a second cryptographic key.

Each records group includes (i) the first cryptographic key and an associated first-layer access restriction indicator, and (ii) the second cryptographic key and an associated second-layer access restriction indicator. At least one of the records group may also include a token identifier that is uniquely associated with the multi-layer token, and at least one user identifier that is associated with a respective one of the encrypted data layers of the multi-layer token.

BRIEF DESCRIPTION OF THE DRAWINGS

An exemplary message processing network, message processing server, and method of providing controlled access to data will now be described, with reference to the accompanying drawings, in which.

DETAILED DESCRIPTION

Message Processing Network—Overview

Figure 1:
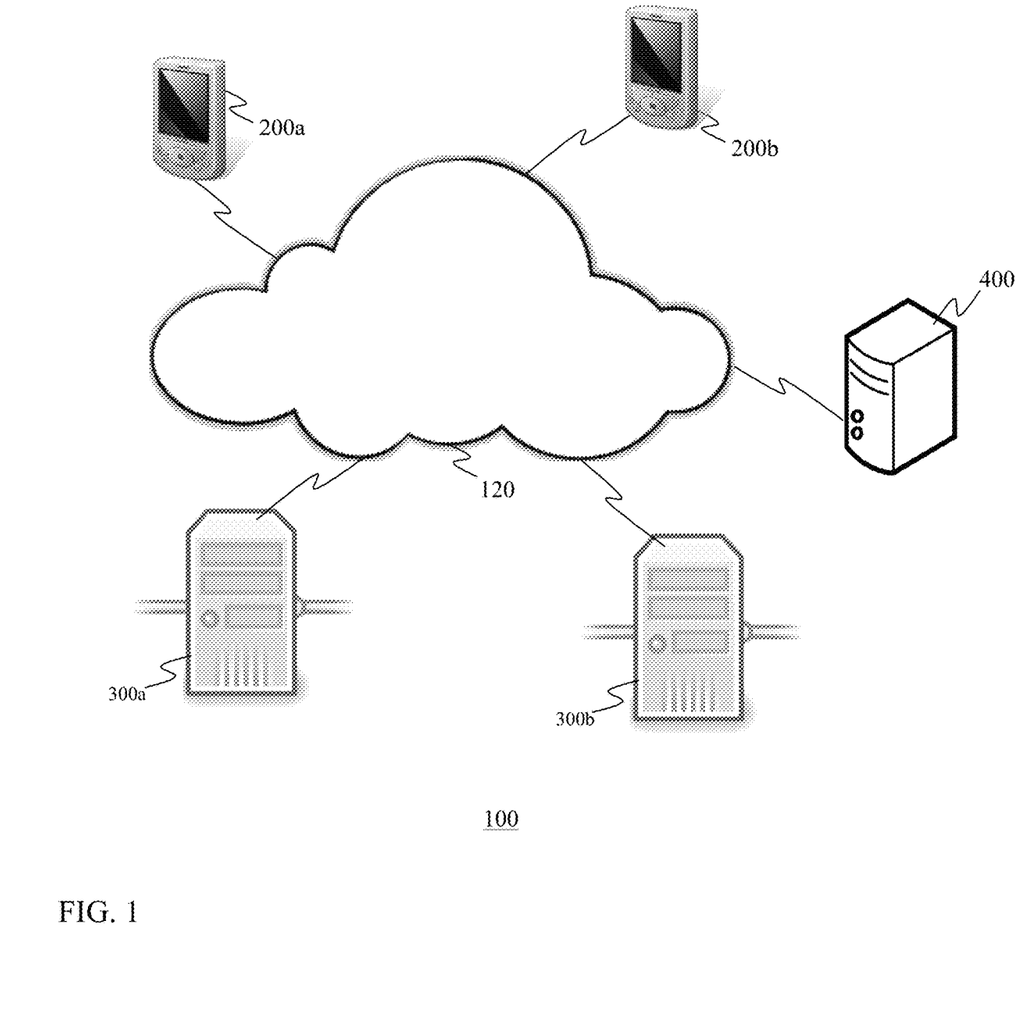
FIG. 1 is a schematic view of the message processing network, depicting a message processing server and a plurality of communications devices.

FIG. 1 is a schematic view of a message processing network, denoted generally as 100. As shown, the message processing network 100 may comprise a first communications device 200a, a second communications device 200b (collectively, communications devices 200), a first service provider server 300a, a second service provider server 300b (collectively, service provider servers 300), and a message processing server 400.

Although the message processing network 100 is shown comprising only two communications devices 200 and only two service provider servers 300, the message processing network 100 typically comprises a plurality of the communications devices 200 and a plurality of the service provider servers 300. Moreover, although the message processing network 100 is shown comprising only a single message processing server 400, the message processing network 100 may include a plurality of the message processing servers 400.

The communications devices 200 communicate with the service provider servers 300 via a wide area network 120, such as the Internet. One or more of the communications devices 200 may be implemented as a wireless communications device configured to operate within a wireless network. As non-limiting examples, one or more of the wireless communications device 200 could be implemented as a wireless-enabled tablet computer, a wireless-enabled PDA, or a smart phone. Accordingly, the wide area network 120 may include a mobile communications network that is configured as a WiFi network, a cellular network, or a combination thereof.

Each service provider server 300 is associated with, and is administered by, a respective service provider, and is configured to administer one or more stages of a multi-stage validation/verification method on behalf of the service provider. As will be explained, before proceeding with a subsequent stage of the multi-stage validation/verification method, each service provider server 300 uses a multi-layer token (received from a customer communications device 200) to confirm that a customer provided the data that the service provider may have required for completion of a previous stage of the multi-stage validation/verification method.

For ease of understanding, the foregoing discussion will make reference to multiple service provider servers 300 (first service provider server 300a, second service provider server 300b . . . ), each associated with a respective stage of the multi-stage validation/verification method. Each service provider server 300a, 300b, . . . may be preconfigured with a respective unique identifier (userIDx). Therefore, each service provider server 300 may identify the current stage of the multi-stage validation/verification method by providing the message processing server 400 with the server's assigned userIDx.

Alternately, the service provider may instead choose to deploy only a single service provider server 300, configured to administer all stages of the multi-stage validation/verification method. In this variation, all service provider employees authorized to execute a particular stage of the multi-stage validation/verification method may be assigned to a common computer group (groupIDx). Therefore, the single service provider server 300 may identify the current stage of the multi-stage validation/verification method by providing the message processing server 400 with the employee's assigned groupIDx. However, for ease of explanation, the following discussion will only refer to multiple service provider servers 300 each having its own userID, but with the expectation that the method can also be implemented using a single service provider server 300.

Figure 3:
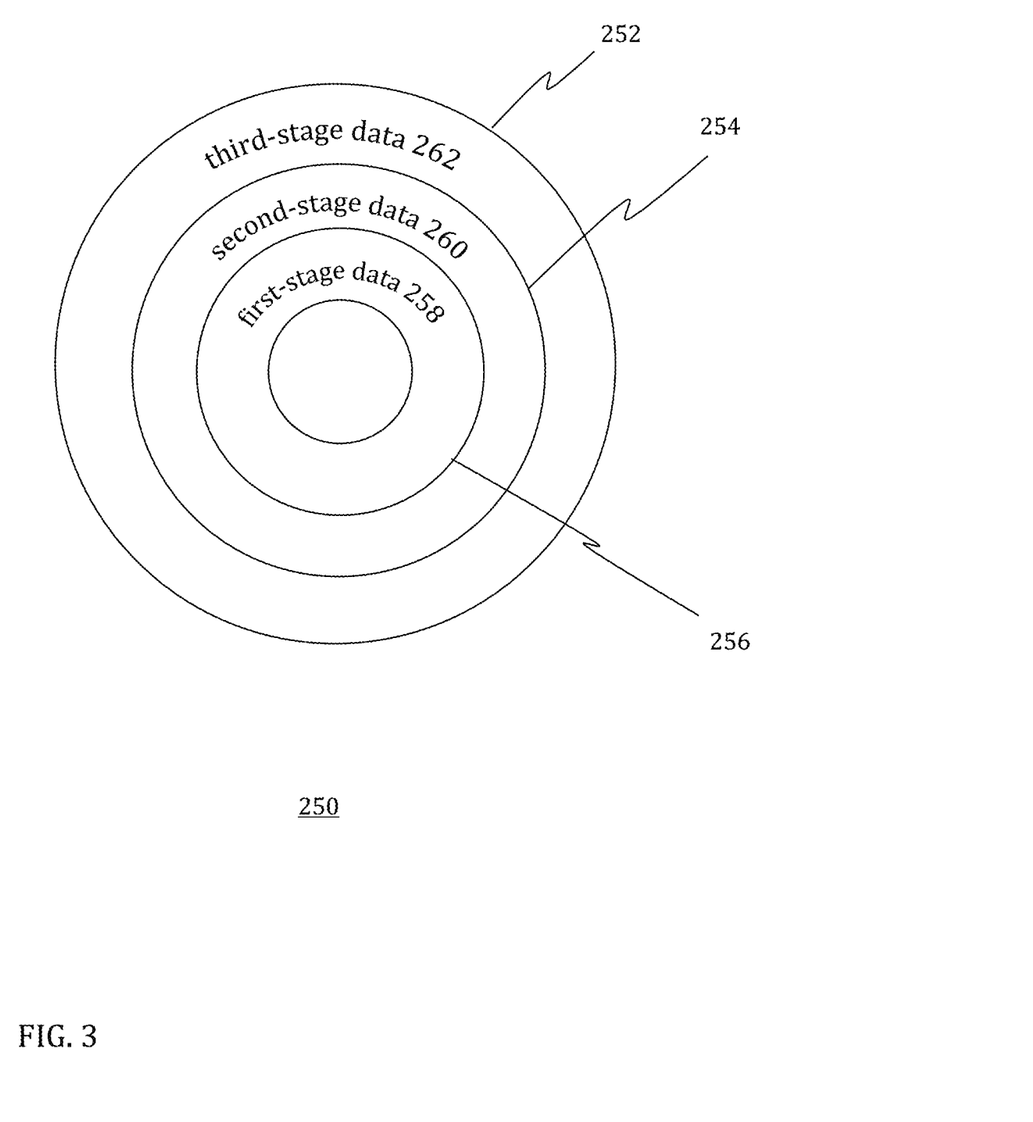
FIG. 3 is a logical representation of one of the multi-layer tokens.

The message processing server 400 may be implemented as a computer server, and is configured to provide controlled access to data that is stored in a data structure that includes a multi-layer token (see FIG. 3). Before adding any data to the multi-layer token, the message processing server 400 confirms that the data that was received during a previous stage of the multi-stage validation/verification method has been stored in the multi-layer token.

Communications Device

Figure 2:
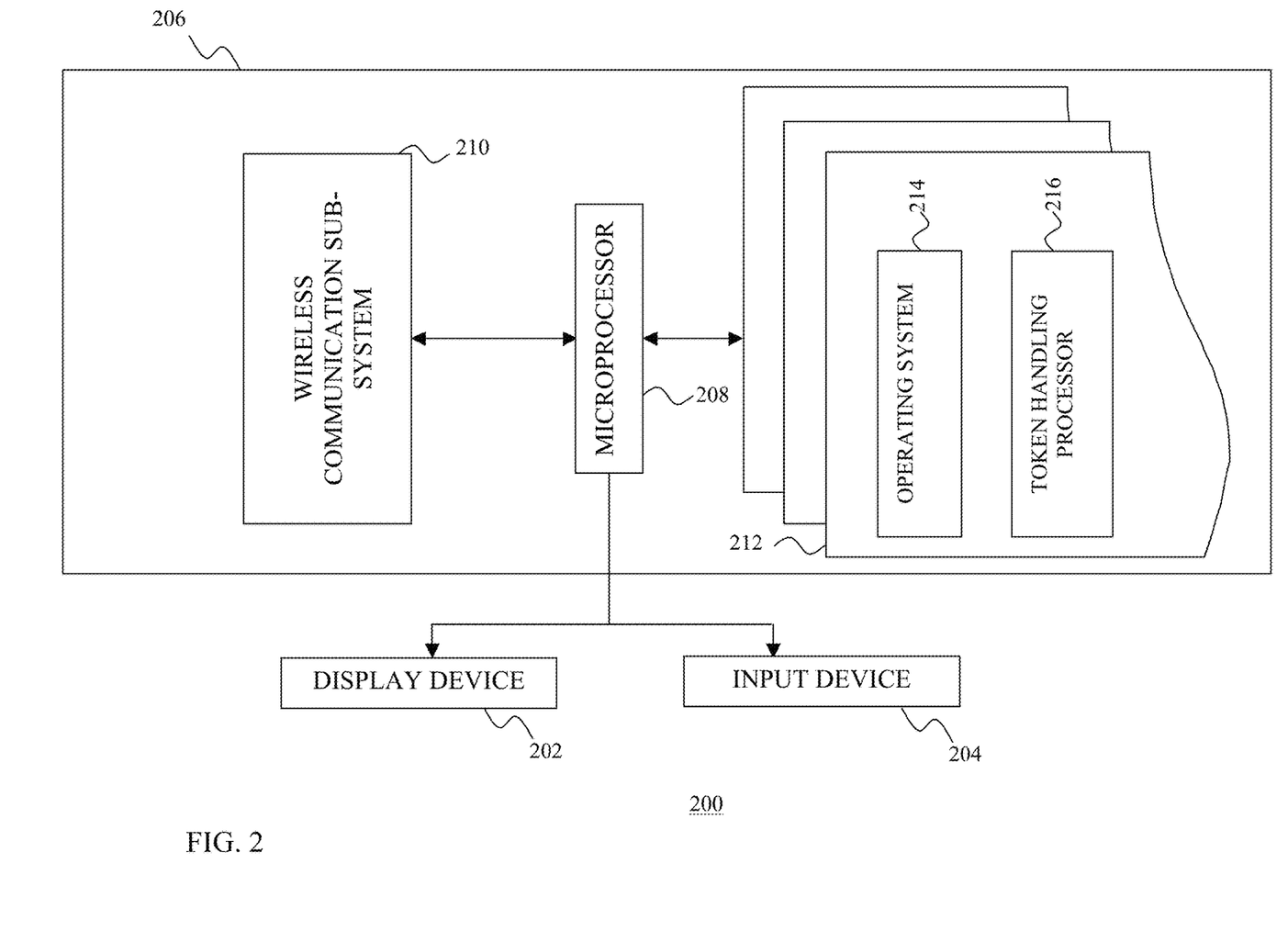
FIG. 2 is a schematic view of one of the communications devices.

A sample communications device 200 is depicted in FIG. 2. As shown, the mobile communications device 200 includes a display 202, user input device 204, and a data processing system 206. The user input device 204 may be provided as a keyboard, biometric input device (e.g. microphone) and/or a touch-sensitive layer provided on the display 202. The data processing system 206 comprises a microprocessor 208, a wireless communication sub-system 210 and a tangible non-transient computer-readable medium 212.

The communication sub-system 210 allows the mobile device 200 to communicate with the wireless network of the wide area network 120. As discussed, the wireless network may be configured as a WiFi network, a cellular network, or a combination thereof. Accordingly, the communication sub-system 210 allows the mobile device 200 to transmit and receive wireless communications signals over WiFi networks and/or cellular networks.

The computer-readable medium 212 typically comprises non-volatile electronic computer memory that stores computer processing instructions which, when accessed from the memory 212 and executed by the microprocessor 208, implement an operating system 214 and a token handling processor 216. The operating system 214 is configured to display output on the display 202, to receive user input from the input device 204, and to send and receive communication signals over the wireless network.

The operation of the token handling processor 216 will be discussed in greater detail below. However, it is sufficient at this point to note that the token handling processor 216 is configured to receive a multi-layer token 250 (for example, after completion of one stage of a multi-stage validation/verification method), and to transmit the multi-layer token 250 to a service provider server (for example, to initiate a subsequent stage of the multi-stage validation/verification method and/or to confirm completion of an earlier stage of the multi-stage validation/verification method).

Multi-Layer Token

As will be discussed, the multi-layer token 250 is part of a unique data structure that provides controlled access to all data that is stored in the multi-layer token 250. As shown in FIG. 3, each multi-layer token 250 includes a plurality of data segments, configured in a hierarchical arrangement, such that each "parent" data segment is associated with a particular stage of the multi-stage validation/verification method, and includes at least one "child" data segment and any additional data that may be required by the associated stage of the multi-stage validation/verification method.

As shown, in one example the multi-layer token 250 comprises a hierarchical arrangement of encrypted data segments (encrypted data "layers"), namely a first encrypted data segment ("innermost" data layer) 256, a second encrypted data segment ("middle" data layer) 254, and optionally also one or more additional encrypted data segments ("outermost" data layers) 252.

In this implementation, the first encrypted data segment ("innermost" data layer) 256 includes first data 258. The first data 258 may comprise data that, for example, a service provider requires to complete a first stage of the multi-stage validation/verification method.

The second encrypted data segment ("middle" data layer) 254 includes second data 260 and the first encrypted data segment ("innermost" data layer) 256.

The second data 260 may comprise data that, for example, a service provider requires to complete a second stage of the multi-stage validation/verification method.

The third encrypted data segment ("outermost" data layer) 252 may include third data 252 and the second encrypted data segment ("middle" data layer) 254. The third data 262 may comprise data that, for example, a service provider requires to complete a third stage of the multi-stage validation/verification method.

Since the first encrypted data segment ("innermost" data layer) 256 includes the first data, and the second encrypted data segment ("middle" data layer) 254 includes the first encrypted data segment 256, the second encrypted data segment 254 also includes the first data. Similarly, since the third encrypted data segment ("outermost" data layer) 252 includes the second encrypted data segment 254, the third encrypted data segment 252 (if included) also includes the first data and the second data.

Message Processing Server

Figure 4:
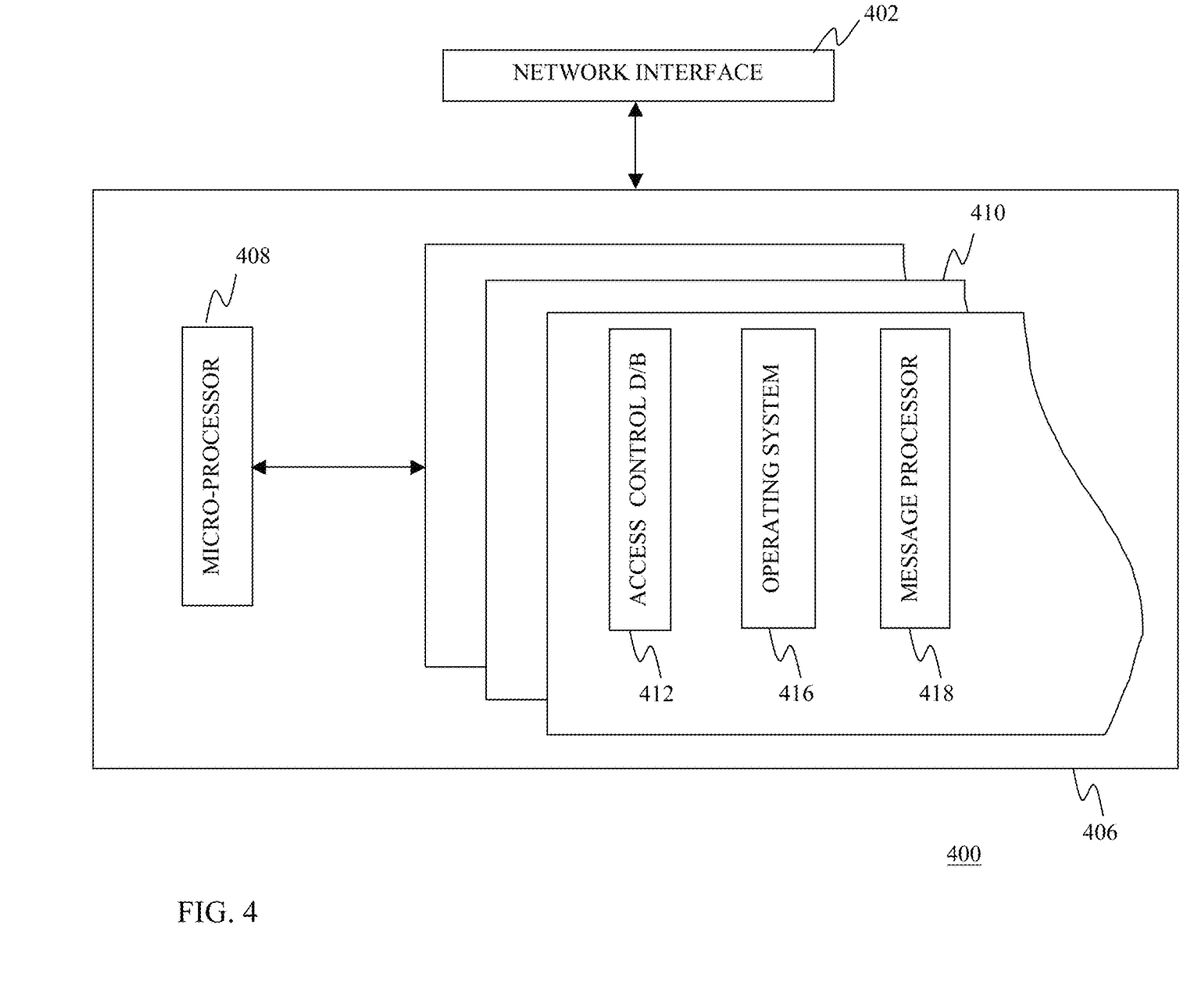
FIG. 4 is a schematic view of the message processing server.

As shown in FIG. 4, the message processing server 400 includes a network interface 402, and a data processing system 406 that is coupled to the network interface 402. The network interface 402 interfaces the message processing server 400 with the financial institution server(s) 300 via the wide area network 120.

The data processing system 406 may include one or more microprocessors 408 and a tangible non-volatile computer-readable medium 410. The computer-readable medium 410 may be provided as electronic computer memory (e.g. flash memory) or optical or magnetic memory (e.g. compact disc, hard disk).

The computer-readable medium 410 may maintain an access control database 412 that stores a plurality of related data records that are associated with a respective multi-layer token 250. Together, each multi-layer token 250 and the associated records group comprises a data structure that provides controlled access to data stored in the multi-layer token 250.

As discussed above, each multi-layer token 250 includes a first encrypted data segment 256, and a second encrypted data segment 254, and may also include one or more additional data segments 252. The first encrypted data segment 256 stores first data. The second encrypted data segment 254 stores second data and the first encrypted data segment 256. The third and subsequent encrypted data segments 252 (if included in the multi-layer token 250) may each store additional data and the immediately preceding encrypted data segment.

Each data segment 252, 254, 256 is encrypted using a respective cryptographic key that is uniquely associated with the respective data segment. Therefore, the first encrypted data segment 256 is encrypted with a first cryptographic key K1, and the second encrypted data segment 254 is encrypted with a second cryptographic key K2. The third and subsequent encrypted data segments 252 (if included in the multi-layer token 250) are each encrypted with a respective cryptographic key K3, K4, . . . , Kn.

The access control database 412 stores layer access restriction indicators and the cryptographic keys K1, K2, Kn for each of the encrypted data segments of each multi-layer token 250. Therefore, the access control database 412 includes (i) the first cryptographic key K1 and a first-layer access restriction indicator associated with the first encrypted data segment 256 of a multi-layer token 250, and (ii) the second cryptographic key K2 and a second-layer access restriction indicator associated with the second encrypted data segment 254 of the multi-layer token 250. The access control database 412 may also include one or more additional layer access restriction indicators and associated cryptographic keys K3, K4, Kn for each of the respective outer data segments 252 (if included in the multi-layer token 250).

In one example, at least one of the data records also includes a token identifier (tokenID) that is uniquely associated with the respective multi-layer token 250 in the access control database 412, and at least one user identifier (userIDx) associated with a respective one of the encrypted data layers.

Each cryptographic key K1, K2, Kn may be a symmetric cryptographic key that is used to generate and decrypt the associated data segment. Therefore, the first cryptographic key K1 may be used to generate and decrypt the first encrypted data segment 256, the second cryptographic key K2 may be used to generate and decrypt the second encrypted data segment 254, and the third cryptographic key K3 may be used to generate and decrypt the third encrypted data segment 252. A master symmetric cryptographic key K0 may be used to generate and decrypt the multi-layer token 250.

Alternately, one or more of the cryptographic keys K1, K2 may be a private cryptographic key of an asymmetric cryptographic key pair. Each private cryptographic key may be used to generate the associated data segment, and each corresponding public cryptographic key may be used to decrypt the associated data segment. Therefore, the first private cryptographic key K1 may be used to generate the primary encrypted data segment 256, the second private cryptographic key K2 may be used to generate the second encrypted data segment 254, and the third private cryptographic key K3 may be used to generate the third encrypted data segment 252. A first public cryptographic key K1' may be used to decrypt the first encrypted data segment 256, a second public cryptographic key K2' may be used to decrypt the second encrypted data segment 254, and a third public cryptographic key K3' may be used to decrypt the third encrypted data segment 252.

The non-transient computer-readable medium 410 may also store computer processing instructions which, when executed by the microprocessor(s) 408, define an operating system 416 that controls the overall operation of the message processing server 400. The computer processing instructions may also implement a message processor 418.

The message processor 418 is configured to (i) receive a first encryption request that includes first data; (ii) save a token identifier (e.g. tokenID) in the access control database 412 in association with a first-layer access restriction indicator and a first cryptographic key (e.g. K1), (iii) generate a first encrypted data layer (e.g. 256) by encrypting the first data with the first cryptographic key, (iv) generate a multi-layer token 250 from the token identifier and the first encrypted data layer, and (v) return the multi-layer token 250 in response to the first encryption request.

The message processor 418 is configured to (vi) receive a second encryption request that includes second data and the multi-layer token 250; (vii) recover the token identifier and the first encrypted data layer from the multi-layer token 250; and (viii) confirm that the recovered token identifier was saved in the access control database 412 in association with the first-layer access restriction indicator.

The message processor 418 is also configured to (ix) save the token identifier in association with a second-layer access restriction indicator and a second cryptographic key (e.g. K2), (x) generate a second encrypted data layer (e.g. 254) by encrypting the first encrypted data layer and the second data with the second cryptographic key, (xi) regenerate the multi-layer token 250 from the token identifier and the second encrypted data layer; and (xii) return the multi-layer token in response to the second encryption request The first encryption request may include a first authentication credential (e.g. userID1), and the message processor 418 may be configured to save the first authentication credential in association with the token identifier and the first-layer access restriction indicator. In this implementation, the message processor 418 may be configured to (a) receive a data access request that includes the first authentication credential and the multi-layer token; (b) recover the token identifier and the second encrypted data layer from the multi-layer token; (c) confirm that the first authentication credential was saved in association with the recovered token identifier and the first-layer access restriction indicator; (d) determine the second cryptographic key from the recovered token identifier; (e) recover the first encrypted data layer by decrypting the second encrypted data layer with the determined second cryptographic key; and (f) return the first encrypted data layer in response to the data access request.

The second encryption request may include a second authentication credential (e.g. userID2), and the message processor 418 may be configured to save the second authentication credential in association with the token identifier and the second-layer access restriction indicator. In this latter implementation, the message processor 418 may also be configured to (a) receive a data access request that includes the second authentication credential and the multi-layer token; (b) recover the token identifier and the second encrypted data layer from the multi-layer token; (c) confirm that the second authentication credential was saved in association with the recovered token identifier and the second-layer access restriction indicator; and (d) return the second encrypted data layer in response to the data access request.

Although the message processor 418 is typically implemented as computer processing instructions, all or a portion of the message processor 418 may be implemented instead in electronics hardware, such as a field programmable logic gate array (FPGA) or a complex programmable logic device (CPLD).

Method of Providing Controlled Access to Data

Figure 5:
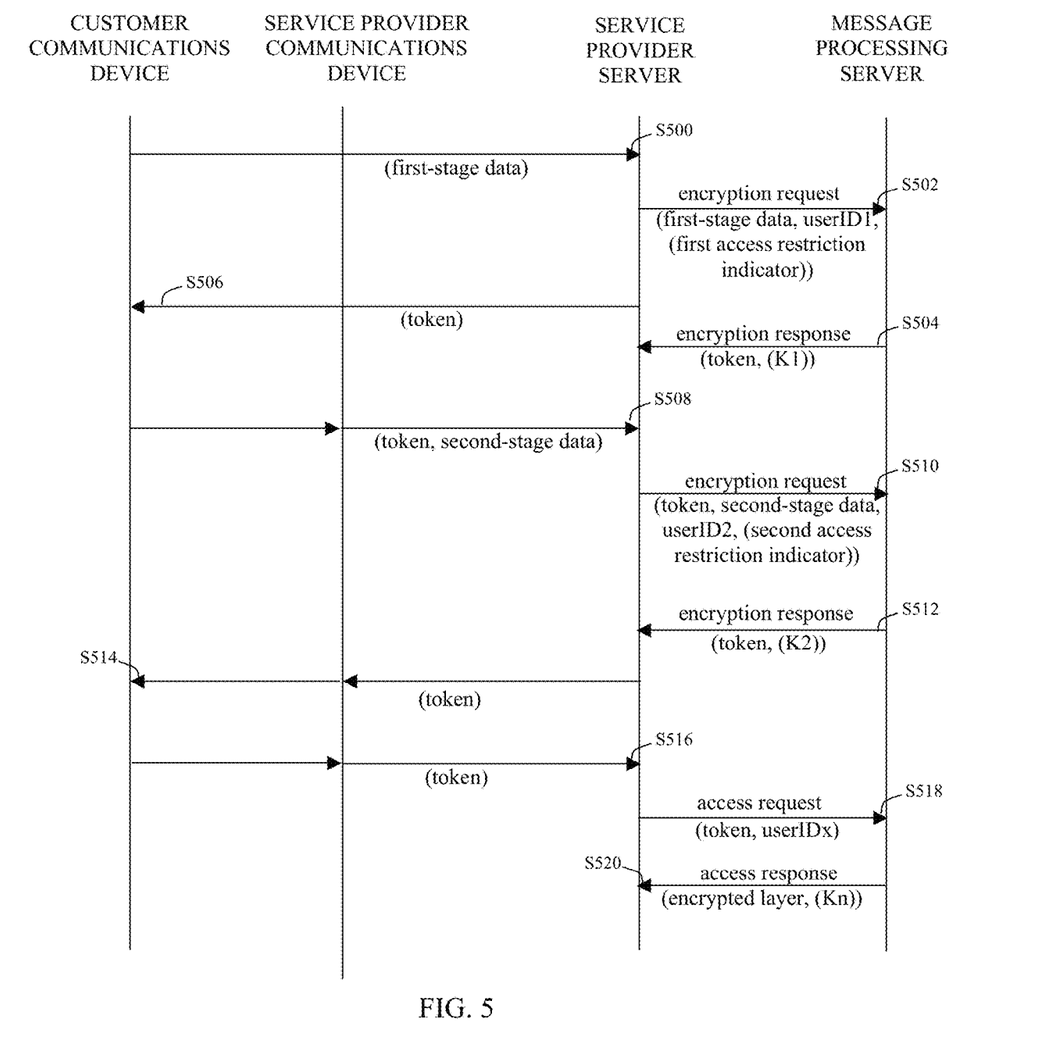
FIG. 5 is a message flow diagram depicting an exemplary method of providing controlled access to data using one of the multi-layer tokens.

As discussed, the message processing network 100 implements a method of providing controlled access to data using a message processor 418 and a data structure that includes a multi-layer token 250. A sample embodiment of the method will be discussed below, with reference to FIG. 5*a*.

By way of overview, each multi-layer token 250 includes a plurality of encrypted data segments/layers. As will be explained, the method involves the message processor 418 (i) receiving a first encryption request that includes first data, (ii) saving a token identifier (e.g. tokenID) in association with a first-layer access restriction indicator and a first cryptographic key (e.g. K1), (iii) generating a first encrypted data layer (e.g. 256) by encrypting the first data with the first cryptographic key, and (iv) generating a multi-layer token (e.g. 250) from the token identifier and the first encrypted data layer. The message processor 418 then returns the multi-layer token in response to the first encryption request.

The method involves the message processor 418 (v) receiving a second encryption request that includes second data and the multi-layer token, (vi) recovering the token identifier and the first encrypted data layer from the multi-layer token, and (vii) confirming that the recovered token identifier was saved in association with the first-layer access restriction indicator.

The method also involves the message processor 418 (viii) saving the token identifier in association with a second-layer access restriction indicator and a second cryptographic key (e.g. K2), (ix) generating a second encrypted data layer (e.g. 254) by encrypting the first encrypted data layer and the second data with the second cryptographic key, and (x) regenerating the multi-layer token by from the token identifier and the second encrypted data layer. The message processor 418 then returns the multi-layer token in response to the second encryption request.

In one implementation, the first encryption request includes a first authentication credential (e.g. userID1), and the step of returning the multi-layer token in response to the first encryption request involves the message processor 418 saving the first authentication credential in association with the token identifier and the first-layer access restriction indicator.

In this implementation, the method may involve the message processor 418 (*a*) receiving a data access request that includes the first authentication credential and the multi-layer token; (b) recovering the token identifier and the second encrypted data layer from the multi-layer token; (c) confirming that the first authentication credential was saved in association with the recovered token identifier and the first-layer access restriction indicator; (d) determining the second cryptographic key from the recovered token identifier; (e) recovering the first encrypted data layer by decrypting the second encrypted data layer with the determined second cryptographic key; and (f) returning the first encrypted data layer in response to the data access request.

In another implementation, the second encryption request includes a second authentication credential (e.g. userID2), and the step of returning the multi-layer token in response to the second encryption response involves the message processor 418 saving the second authentication credential in association with the token identifier and the second-layer access restriction indicator.

In this latter implementation, the method may involve the message processor 418 (*a*) receiving a data access request that includes the second authentication credential and the multi-layer token; (b) recovering the token identifier and the second encrypted data layer from the multi-layer token; (c) confirming that the second authentication credential was saved in association with the recovered token identifier and the second-layer access restriction indicator; and (d) returning the second encrypted data layer in response to the data access request.

An example method of providing controlled access to data will now be discussed in detail with reference to FIG. 5. The method includes the following two phases: (1) a token generation phase, and (2) a data recovery phase. Both phases are discussed below under their respective headings. Although the data recovery phase will be described after the token generation phase, it should be understood that aspects of the data recovery phase may also occur concurrently with the token generation phase.

(1.1) Token Generation: First Stage

At the outset of the method, a customer of a service provider may connect to a first service provider server 300a of the service provider, via the customer's communications device 200a. The customer may then use the customer's communications device 200a to invoke a validation/verification procedure implemented by the first service provider server 300a, thereby initiating a first stage of a multi-stage validation/verification method (such as the approval of a mortgage or financial loan).

Although the method will be described in the context of a mortgage application, the method is not limited to mortgage applications but may be used to facilitate any multi-stage validation/verification method (e.g. applications for (un)employment benefits, security clearance, college/university admission) where completion of one validation step of the method might be contingent on verification of completion of a previous validation step of the method.

Upon invocation of the validation/verification procedure, the first service provider server 300a may commence the first stage of the validation/verification method by requesting, from the customer, data ("first stage data") 258 that the service provider may require (e.g. customer's name, home mailing address, e-mail address) before the service provider can proceed to the second stage of the validation/verification method. The customer may use the customer's communications device 200a to provide the first service provider server 300a with the requested first stage data 258, at step S500.

Depending on the requirements of the validation/verification method, the service provider associated with the first service provider server 300a may validate the first stage data 258. For example, if the customer initiated the validation/verification method to place a mortgage with the service provider, and the first stage data 258 requested was the customer's home mailing address or e-mail address, and, the service provider may validate the first stage data 258 by, for example, posting (or e-mail) to the customer, at the specified address, a letter that includes a unique code that the customer must return to the service provider to confirm that the customer has the specified (e-mail) address.

Alternately, if the customer initiated the validation/verification method to obtain (un)employment benefits from the service provider, and the first stage data 258 requested was the customer's home mailing address or e-mail address, the service provider might not need to confirm that the customer has the specified (e-mail) address and, therefore, might simply dispense with validating the first stage data 258 and instead accept the first stage data 258 at face value.

After the service provider validates the first stage data 258 (if required), at step S502 the first service provider server 300a generates a first encryption request message that includes the first stage data 258, and the user identifier userID1 that is uniquely associated with the first service provider server 300a, and transmits the first encryption request message to the message processing server 400.

Optionally, the customer and/or service provider may want to restrict access to the first stage data 258 to the first service provider server 300a. Therefore, the first encryption request message may include a first-layer access restriction indicator that indicates that access to the first stage data 258 should be restricted to the first service provider server 300a.

In response to the first encryption request message, the message processing server 400 begins to generate a unique data structure for the customer, based on at least the first stage data 258. The data structure includes a multi-layer token 250, and associated cryptographic key(s) and access restriction indicator(s).

As discussed, each multi-layer token 250 includes a hierarchical arrangement of encrypted data segments/layers. In one example, the multi-layer token 250 includes at least a first encrypted data segment/layer 256, and a second encrypted data layer 254. The first encrypted data layer 256 includes the first stage data 258. The second encrypted data layer 254 includes at least the first encrypted data layer 256.

The multi-layer token 250 may ultimately also include a third encrypted data segment/layer 252 that includes at least the second encrypted data layer 254. Depending on the requirements of the validation/verification method, the multi-layer token 250 may include "n+2" such encrypted data layers, where n>0 and encrypted layer includes the immediately preceding (n+1) encrypted data layer.

The message processing server 400 begins to generate the data structure by generating a unique token identifier (tokenID), a first-layer access restriction indicator, and the first encrypted data layer 256 for a multi-layer token 250.

The message processing server 400 generates the first encrypted data layer 256 by applying a first cryptographic key K1 and the first stage data 258 as inputs to a cryptographic algorithm, to thereby encrypt the first stage data 258 with the first cryptographic key K1. The message processing server 400 then generates the multi-layer token 250 from the token identifier tokenID and the first encrypted data layer 256, in one example by applying a master cryptographic key K0, the token identifier tokenID and the first encrypted data layer 256 as inputs to a cryptographic algorithm, and thereby encrypting the first encrypted data layer 256 (and the token identifier tokenID) with the master cryptographic key K0.

The message processing server 400 may generate the token identifier tokenID and the cryptographic keys K0, K1 by employing any suitable cryptographic technique known in the art, including generating each tokenID/key from a pseudo-random number generator or a noise generator. Alternately, the first service provider server 300a may include the first cryptographic key K1 in the first encryption request message (and optionally also generate the first cryptographic key K1), at step S502.

Prior, or subsequent to generating the multi-layer token 250, the message processing server 400 also saves the token identifier tokenID, in the access control database 412, in association with the first-layer access restriction indicator, the first cryptographic key K1, the user identifier userID1 of the first service provider server 300a, and the first-layer access restriction indicator (if included in the first encryption request message).

As will be explained, the message processing server 400 may subsequently update the data structure for the customer by adding additional encrypted data layers to the multi-layer token 250 and by adding incrementally-greater (second, third . . . ) layer access restriction indicators (and respective associated cryptographic keys K2, K3 . . . ) to the access control database 412, as subsequent stages of the validation/verification method are completed.

Further, prior to adding a subsequent encrypted data layer to a multi-layer token 250, the message processing server 400 may also use the highest layer access restriction indicator, that is associated with the token identifier tokenID of the token 250 in the access control database 412, to determine the number of encrypted data layers that have already been saved in the token 250. As a result, the message processing server 400 confirms that the immediately-preceding stage of the validation/verification method has been completed before proceeding to a subsequent stage of the method.

After generating the multi-layer token 250 (and saving the first-layer access restriction indicator in association with the token identifier tokenID in the access control database 412), the message processing server 400 generates a first encryption response message that includes the multi-layer token 250 (and the first cryptographic key K1, unless provided to the message processing server 400 at step S502).

At step S504, the message processing server 400 transmits the first encryption response message to the first service provider server 300a, in response to the first encryption request message. In response, the first service provider server 300a extracts the multi-layer token 250 from the first encryption response message, and transmits the multi-layer token 250 to the customer's communications device 200, at step S506, thereby concluding the first stage of the validation/verification method. The first service provider server 300a also saves the first cryptographic key K1 (unless previously saved when/if the first service provider server 300a included the first cryptographic key K1 in the first encryption response message, at step S502).

The data processing system 206 of the customer's communications device 200 saves the multi-layer token 250 in the memory 212 of the customer's communications device 200, and may notify the customer that the first stage of the multi-stage validation/verification method has been completed.

(1.2) Token Generation: Second Stage

After completing the first stage of the multi-stage validation/verification method, the customer may connect to a second service provider server 300b of the service provider, via the customer's communications device 200a. The customer may then use the customer's communications device 200a to invoke a validation/verification procedure implemented by the second service provider server 300b, thereby initiating a second stage of the multi-stage validation/verification method.

Upon invocation of the validation/verification procedure, the second service provider server 300b may commence the second stage of the validation/verification method by requesting, from the customer, a copy of the multi-layer token 250 and data ("second stage data") 260 that the service provider may require (e.g. driver's license number, customer's annual income) before the service provider can proceed to a third stage of the validation/verification method.

The customer may initiate the token handling processor 216 on the customer's communications device 200a, and use the input device 204 thereof to input the second stage data 260 to the token handling processor 216. In response, the token handling processor 216 may transmit the multi-layer token 250 and the second stage data 260 to the second service provider server 300b, at step S508.

Alternately, the service provider may require that the customer provide physical (original) documentation depicting the second stage data 260 (e.g. driver's license, original tax certificate) and, therefore, the customer may attend at a physical place of business of the service provider to supply the required physical second stage data 260

In this latter variation, the second service provider server 300b may be in communication with, or implemented on, a communications device 200b that is located at the physical place of business of the service provider. Accordingly, before (or after) the customer provides the service provider with the required physical second stage data 260, the token handling processor 216 of the customer's communications device 200a may wirelessly transmit the multi-layer token 250 to the second service provider server 300b, via the service provider's communications device 200b, at step S508. As non-limiting examples, the token handling processor 216 of the customer's communications device 200a may wirelessly transmit the multi-layer token 250 to the service provider's communications device 200b directly (for example via Bluetooth or NFC) or indirectly (for example via WiFi or cellular communications) by e-mail or a relay and proximity service, for example the relay service provided by Bump Technologies.

Depending on the requirements of the validation/verification method, the service provider may validate the second stage data 260. For example, if the customer initiated the validation/verification method to place a mortgage with the service provider, and the second stage data 260 requested was the customer's driver's licence number and annual income, the service provider may validate the second stage data 260 by, for example, confirming that the person depicted on the driver's license is the same person who is in attendance at the premises of the service provider, and confirming that the address appearing on the tax certificate matches the address appearing on the driver's license. Alternately, as discussed above, the service provider might instead accept the second stage data 260 at face value.

After the service provider validates the second stage data 260 (if required), at step S510 the second service provider server 300b generates a second encryption request message that includes the multi-layer token 250, the second stage data 260, and the user identifier userID2 that is uniquely associated with the second service provider server 300b, and transmits the second encryption request message to the message processing server 400.

Optionally, the customer and/or service provider may want to restrict access to the second stage data 260 to the second service provider server 300b. Therefore, the second encryption request message may include a second-layer access restriction indicator that indicates that access to the second stage data 260 should be restricted to the second service provider server 300b.

In response to the second encryption request message, the message processing server 400 the message processing server 400 determines from the multi-layer token 250 whether the immediately-preceding (first) stage of the validation/verification method has been completed. Therefore, the message processing server 400 recovers the token identifier tokenID and the first encrypted data layer 256 from the multi-layer token 250, in one example by decrypting the multi-layer token 250 with the master cryptographic key K0, and queries the access control database 412 with the recovered token identifier tokenID to determine the highest layer access restriction indicator that is associated with the token identifier tokenID in the access control database 412.

If the message processing server 400 determines that the token identifier tokenID has not been saved in the access control database 412, or determines that the token identifier tokenID has not been associated with at least a first-layer access restriction indicator in the access control database 412 (i.e. the message processing server 400 did not generate the multi-layer token 250), the message processing server 400 terminates the second stage of the validation/verification method, and generates a second encryption response message that indicates, for example, that the multi-layer token 250 is not authentic. At step S512, the message processing server 400 transmits the second encryption response message to the second service provider server 300b, in response to the second encryption request message.

Otherwise, if the message processing server 400 determines that a first-layer access restriction indicator is the highest layer access restriction indicator that is associated with the token identifier tokenID in the access control database 412 (thereby confirming that the immediately-preceding (first) stage of the validation/verification method has been completed), the message processing server 400 begins to update the unique data structure for the customer, based on at least the second stage data 260.

As discussed, the unique data structure includes a multi-layer token 250, and associated cryptographic key(s) and access restriction indicator(s). In one example, the multi-layer token 250 includes at least the first encrypted data segment/layer 256, and a second encrypted data layer 254. The second encrypted data layer 254 includes the first encrypted data layer 256 and the second stage data 260.

The message processing server 400 begins to update the data structure by generating a second-layer access restriction indicator, and the second encrypted data layer 254 for the multi-layer token 250.

The message processing server 400 generates the second encrypted data layer 254 by applying a second cryptographic key K2, the first encrypted data layer 256 and the second stage data 260 as inputs to a cryptographic algorithm, to thereby encrypt the second stage data 260 and the first encrypted data layer 256 with the second cryptographic key K2. The message processing server 400 then regenerates the multi-layer token 250 from the token identifier tokenID and the second encrypted data layer 254, in one example by applying the master cryptographic key K0, the token identifier tokenID and the second encrypted data layer 254 as inputs to a cryptographic algorithm, and thereby encrypting the second encrypted data layer 254 (and the token identifier tokenID) with the master cryptographic key K0.

As discussed, the message processing server 400 may generate the cryptographic key K2 by employing any suitable cryptographic technique known in the art, including generating each tokenID/key from a pseudo-random number generator or a noise generator. Alternately, the second service provider server 300b may include the second cryptographic key K2 in the second encryption request message (and optionally also generate the second cryptographic key K2), at step S510.

Prior, or subsequent to regenerating the multi-layer token 250, the message processing server 400 also saves the token identifier tokenID, in the access control database 412, in association with the second-layer access restriction indicator, the second cryptographic key K2, the user identifier userID2 of the second service provider server 300b, and the second-layer access restriction indicator (if included in the second encryption request message).

After regenerating the multi-layer token 250 (and saving the second-layer access restriction indicator in association with the token identifier tokenID in the access control database 412), the message processing server 400 generates a second encryption response message that includes the regenerated multi-layer token 250 (and the second cryptographic key K2, unless provided to the message processing server 400 at step S510).

At step S512, the message processing server 400 transmits the second encryption response message to the second service provider server 300b, in response to the second encryption request message. In response, the second service provider server 300b extracts the regenerated multi-layer token 250 from the second encryption response message, and transmits the regenerated multi-layer token 250 to the customer's communications device 200a (either directly, or via the service provider's communications device 200b), at step S514, thereby concluding the second stage of the validation/verification method. The second service provider server 300b also saves the second cryptographic key K2 (unless previously saved when/if the second service provider server 300b included the second cryptographic key K2 in the second encryption response message, at step S510).

The data processing system 206 of the customer's communications device 200 saves the regenerated multi-layer token 250 in the memory 212 of the customer's communications device 200a, and may notify the customer that the second stage of the multi-stage validation/verification method has been completed.

(1.3) Token Generation: Third and Subsequent Stages

After completing the second stage of the multi-stage validation/verification method, the customer may repeat the foregoing steps until all stages of the multi-stage validation/verification method have been completed.

Therefore, if, for example, the service provider requires a nth stage of the multi-stage validation/verification method, the customer may provide a service provider server 300n with the multi-layer token and nth stage data 262, in a similar fashion to that discussed above with reference to step S508.

After the service provider validates the nth stage data 262 (if required), the service provider server 300n generates an encryption request message that includes the multi-layer token 250, the nth stage data 262, and the user identifier userIDn that is uniquely associated with the service provider server 300n (and optionally a nth-layer access restriction indicator), and transmits the encryption request message to the message processing server 400.

In response, the message processing server 400 the message processing server 400 determines from the multi-layer token 250 whether the immediately-preceding (n−1) stage of the validation/verification method has been completed. Therefore, the message processing server 400 recovers the token identifier tokenID and the (n−1)th encrypted data layer from the multi-layer token 250, in one example by decrypting the multi-layer token 250 with the master cryptographic key K0, and queries the access control database 412 with the recovered token identifier tokenID to determine the highest layer access restriction indicator that is associated with the token identifier tokenID in the access control database 412.

If the message processing server 400 determines that the immediately-preceding (n−1) stage of the validation/verification method was not completed, the message processing server 400 terminates the nth stage of the validation/verification method, and generates an encryption response message that indicates, for example, that the immediately-preceding stage of the validation/verification method was not completed. Otherwise, if the message processing server 400 determines that the immediately-preceding (n−1) stage of the validation/verification method was completed, the message processing server 400 begins to update the unique data structure for the customer.

The message processing server 400 begins to update the data structure for the customer by generating a nth layer access restriction indicator, and the nth encrypted data layer for the multi-layer token 250. The message processing server 400 generates the nth encrypted data layer by encrypting the nth stage data 262 and the (n−1)th encrypted data layer with the nth cryptographic key Kn. The message processing server 400 then regenerates the multi-layer token 250 from the nth encrypted data layer and the token identifier tokenID, in one example by encrypting the nth encrypted data layer and the token identifier tokenID with the master cryptographic key K0. The message processing server 400 also saves the token identifier tokenID, in the access control database 412, in association with the nth layer access restriction indicator, the nth cryptographic key Kn, the user identifier userIDn of the service provider server 300n, and the nth-layer access restriction indicator (if included in the encryption request message).

As discussed, the message processing server 400 may generate the nth cryptographic key Kn by employing any suitable cryptographic technique known in the art, including generating each tokenID/key from a pseudo-random number generator or a noise generator. Alternately, the service provider server 300n may include the nth cryptographic key Kn in the encryption request message.

In one example, the cryptographic keys K1, K2, K3 Kn are each uniquely associated (in the access control database 412) with a respective one of the data layers. The message processing server 400 may confirm that each cryptographic key K1, K2, K3 Kn is uniquely associated (in the access control database 412) with the respective data layer, and that each token identifier tokenID is uniquely associated (in the access control database 412) with a multi-layer token 250, by querying the access control database 412 with the key/tokenID, and saving the key/tokenID in the access control database 412 only after confirming that the key/tokenID has not already been saved to the access control database 412.

After the message processing server 400 regenerates the multi-layer token 250 and saves the nth layer access restriction indicator in the access control database 412, the message processing server 400 generates an encryption response message that includes the regenerated multi-layer token 250 (and the nth cryptographic key Kn, unless previously provided to the message processing server 400). The message processing server 400 transmits the encryption response message to the service provider server 300n. The service provider server 300n then transmits the regenerated multi-layer token 250 to the customer's communications device 200a, thereby concluding the nth stage of the validation/verification method.

(2) Data Recovery Phase

During the token generation phase, the phase message processing server 400 does not provide the service provider with access to any of the data stored in the multi-stage token 250. Instead, as discussed above, the phase message processing server 400 adds the nth encrypted data layer to the multi-layer token 250 without decrypting any of the preceding (n−1)th encrypted data layers.

However, after the nth encrypted data layer has been added to the multi-layer token 250 (i.e. after the nth stage of the validation/verification method has been completed), the service provider server 300(n-m) might require access to the data in the (n-m)th encrypted data layer (and optionally one or more of the preceding encrypted data layers) of the multi-layer token 250. For example, after the first, second and third encrypted data layers 256, 254, 252 have been added to the multi-layer token 250, the first service provider server 300a might require access to the first stage data 258 stored in the first encrypted data 256.

Therefore, the service provider may obtain access to the required data by initiating a data recovery phase, requesting a multi-layer token 250 from the customer. In the foregoing example, the customer may provide the first service provider server 300a with the multi-layer token 250, in a similar fashion to that discussed above with reference to step S508. Therefore, at step S516, the customer may connect to the first service provider server 300a, via the customer's communications device 200a, and use the token handling processor 216 on the customer's communications device 200a to transmit the multi-layer token 250 to the first service provider server 300a. Alternately, the customer may attend at a physical place of business of the service provider and use the token handling processor 216, at step S516, to wirelessly transmit the multi-layer token 250 to the first service provider server 300a, via the service provider's communications device 200b.

After the first service provider server 300a receives the multi-layer token 250, at step S518 the first service provider server 300a generates a data access request message that includes the multi-layer token 250 and the user identifier userID1 that is uniquely associated with the first service provider server 300a, and transmits the data access request message to the message processing server 400.

In response, the message processing server 400 the message processing server 400 recovers the token identifier tokenID and the outermost (i.e. third encrypted data layer 252, in this example), in one example by decrypting the multi-layer token 250 with the master cryptographic key K0.

The message processing server 400 then determines whether the second service provider server 300b is authorized to access data stored in the multi-layer token 250. Therefore, the message processing server 400 may query the access control database 412 with the recovered token identifier tokenID to determine the user identifier(s) and the access restriction indicator(s) that are associated with the multi-layer token 250, and then determine whether the user identifier userID1 was saved, in the access control database 412, in association with the token identifier token ID.

If the message processing server 400 determines that the token identifier tokenID has not been saved in the access control database 412 (i.e. the message processing server 400 did not generate the multi-layer token 250), or determines that the user identifier userID1 has not been associated with the token identifier tokenID in the access control database 412 (i.e. the first service provider server 300a is not authorized to access data in the multi-layer token 250), the message processing server 400 terminates the data recovery phase. The message processing server 400 may then generate a data access response message that indicates, for example, that the first service provider server 300a is not authorized to access data in the multi-layer token 250. At step S520, the message processing server 400 transmits the data access response message to the first service provider server 300a, in response to the data access request message.

Otherwise, if the message processing server 400 determines that the user identifier userID1 has been associated with the recovered token identifier tokenID in the access control database 412 (i.e. the first service provider server 300a is authorized to access data in the multi-layer token 250), the message processing server 400 determines the highest layer access restriction that is associated with the user identifier userID1 and the recovered token identifier tokenID in the access control database 412, thereby identifying the highest encrypted data layer that the first service provider server 300a is authorized to access in the multi-layer token 250.

The message processing server 400 then recovers, from the access control database 412, all the cryptographic key(s) that are associated with the encrypted data layers that are higher than the highest encrypted data layer that the first service provider server 300a is authorized to access in the multi-layer token 250. The message processing server 400 then uses the recovered cryptographic keys to successively decrypt the encrypted data layers of the multi-layer token 250, as required, until the message processing server 400 recovers the highest encrypted data layer that the first service provider server 300a is authorized to access.

Therefore, continuing with the foregoing example, the message processing server 400 may determine that a first-layer access restriction indicator is the highest layer access restriction indicator that is associated with the user identifier userID1 and with the recovered token identifier tokenID in the access control database 412 (i.e. the first service provider server 300a is not authorized to access the second or third encrypted data layers 254, 252). Accordingly, the message processing server 400 may query the access control database 412 with the recovered token identifier tokenID to recover the second and third cryptographic keys K2, K3 that are associated with the multi-layer token 250. The message processing server 400 may then recover the second encrypted data layer 254 by decrypting the third encrypted data layer 252 of the multi-layer token 250 with the third cryptographic key K3, and recover the first encrypted data layer 256 by decrypting the second encrypted data layer 254 with the second cryptographic key K2.

At step S520, the message processing server 400 may generate a data access response message that includes the first encrypted data layer 256, and transmit the data access response message to the first service provider server 300a, in response to the data access request message.

Alternately, the second service provider server 300b might require access to the second stage data 260 stored in the second encrypted data layer 254 (and optionally also the first stage data 258 stored in the first encrypted data layer 256). Therefore, in this variation, the customer may provide the second service provider server 300b with the multi-layer token 250, at step S516. At step S518, the second service provider server 300b generates a data access request message that includes the multi-layer token 250 and the user identifier userID2 that is uniquely associated with the second service provider server 300b, and transmits the data access request message to the message processing server 400.

In response, the message processing server 400 the message processing server 400 recovers the token identifier tokenID and the third encrypted data layer 252 from the multi-layer token 250, in one example by decrypting the multi-layer token 250 with the master cryptographic key K0. After the message processing server 400 determines that the second service provider server 300b is authorized to access data in the multi-layer token 250, the message processing server 400 identifies the highest encrypted data layer that the second service provider server 300b is authorized to access in the multi-layer token 250 (as described above).

The message processing server 400 then recovers, from the access control database 412, all the cryptographic key(s) that are associated with the encrypted data layers that are higher than the highest encrypted data layer that the second service provider server 300b is authorized to access in the multi-layer token 250. The message processing server 400 then uses the recovered cryptographic keys to successively decrypt the encrypted data layers of the multi-layer token 250, as required, until the message processing server 400 recovers the highest encrypted data layer that the second service provider server 300b is authorized to access.

Therefore, continuing with this latter example, the message processing server 400 may determine that a second-layer access restriction indicator is the highest layer access restriction indicator that is associated with the user identifier userID2 and the recovered token identifier tokenID in the access control database 412. Accordingly, the message processing server 400 may query the access control database 412 with the recovered token identifier tokenID to recover the third cryptographic key K3 that is associated with the multi-layer token 250, and then recover the second encrypted data layer 254 by decrypting the third encrypted data layer 252 of the multi-layer token 250 with the third cryptographic key K3.

Based on the access restriction indicators (if any) that are saved in the access control database 412 in association with the token identifier tokenID and with the preceding encrypted data layers, the message processing server 400 may determine that the second service provider server 300b is authorized to only access the second stage data 260 stored in the second encrypted data layer 254. Therefore, in this implementation, at step S520 the message processing server 400 may generate a data access response message that includes the second encrypted data layer 254, and may transmit the data access response message to the second service provider server 300b, in response to the data access request message. The second service provider server 300b may then recover the second stage data 260 by decrypting the second encrypted data layer 254 with its second cryptographic key K2.

Alternately, based on the access restriction indicators that are saved in the access control database 412 in association with the preceding encrypted data layers, the message processing server 400 may determine that the second service provider server 300b is authorized to access the data stored in the second encrypted data layer 254 and all preceding encrypted data layers (i.e. the first encrypted data layer 256) of the multi-layer token 250. Therefore, in this alternate implementation, the message processing server 400 may query the access control database 412 with the recovered token identifier tokenID to recover the cryptographic keys (i.e. the first cryptographic key K1) associated with the preceding encrypted data layers of the multi-layer token 250. At step S520, the message processing server 400 may then generate a data access response message that includes the second encrypted data layer 254 and the first cryptographic key K1, and transmit the data access response message to the second service provider server 300b, in response to the data access request message.

The second service provider server 300b may then recover the second stage data 260 and the first encrypted data layer 256 by decrypting the second encrypted data layer 254 with its second cryptographic key K2, and then recover the first stage data 258 by decrypting the first encrypted data layer 256 with the first cryptographic key K1.

As discussed, although the data recovery phase may occur subsequent to the token generation phase, aspects of the data recovery phase may also occur concurrently with the token generation phase. For example, the message processing server 400 might incorporate only the regenerated multi-layer token 250 (and optionally the second cryptographic key K2) into the second encryption response message at step S512. However, the service provider might require more positive confirmation from the message processing server 400 that the immediately-preceding stage of the validation/verification method was completed.

Therefore, in one variation, after the message processing server 400 determines that the immediately-preceding stage of the validation/verification method was completed, the message processing server 400 incorporates the first encrypted data layer 256 and the first cryptographic key K1 into the second encryption response message at step S512 (subject to the access restriction indicators (if any) that are saved in the access control database 412). In this variation, before the customer is provided with the multi-layer token 250, the second service provider server 300b can decrypt the first encrypted data layer 256 to thereby allow the service provider to review the first stage data before concluding the second stage of the multi-stage validation/verification method.

As will be apparent from the foregoing discussion, the data structure described herein introduces irrevocability into a multi-stage validation/verification method, such that inclusion of an encrypted data layer in the data structure consists conclusive evidence of completion of each preceding stage of the multi-stage validation/verification method. Therefore, the data structure allows a service provider to participate in a multi-stage validation/verification method without having to revalidate any of the data provided at previous stages of the multi-stage validation/verification method, thereby improving the integrity of the validation/verification method.

The data structure also allows the service provider to store sensitive customer data (multi-layer token 250) separately from the access control database 412 (e.g. on the customer's communications device 200a), thereby minimizing the service provider's data storage requirements while also improving data security.

Further, the data structure provides controlled access to the data stored therein, and prevents the data from being altered after storage in the data structure. Therefore, the data structure allows a customer to participate in a multi-stage validation/verification method by passing the data structure to various entities, but with reduced concern as to the possibility of unauthorized disclosure of the customer's data.

The invention claimed is:

1. A message processing server comprising:
a memory; and
a message processor coupled to the memory and configured to:
receive from a first service provider server a first encryption request including first data and a first-layer access restriction indicator;
save a token identifier in the memory in association with the first-layer access restriction indicator and a first cryptographic key, generate a first encrypted data layer by encrypting the first data with the first cryptographic key, and generate a multi-layer token from the token identifier and the first encrypted data layer, the first-layer access restriction indicator indicating access to the first encrypted data layer is restricted to the first service provider server;
return the multi-layer token to the first service provider server in response to the first encryption request;
receive from a second service provider server a second encryption request including second data, the multi-layer token and a second-layer access restriction indicator, wherein the second service provider server is different than the first service provider server;
recover the token identifier and the first encrypted data layer from the multi-layer token;
confirm that the recovered token identifier was saved in the memory in association with the first-layer access restriction indicator prior to receiving the second encryption request;
save the token identifier in the memory in association with the second-layer access restriction indicator and a second cryptographic key, generate a second encrypted data layer by encrypting the first encrypted data layer and the second data with the second cryptographic key, and regenerate the multi-layer token from the token identifier and the second encrypted data layer, the second-layer access restriction indicator indicating access to the second encrypted data layer is restricted to the second service provider server; and
return the multi-layer token to the second service provider server in response to the second encryption request.

2. The message processing server according to claim 1, wherein:
the first encryption request includes a first authentication credential associated with the first service provider server, and the second encryption request includes a second authentication credential associated with the second service provider server;
the returning the multi-layer token in response to the first encryption request comprises the message processor saving in the memory the first authentication credential in association with the token identifier and the first-layer access restriction indicator; and
the returning the multi-layer token in response to the second encryption response comprises the message processor saving in the memory the second authentication credential in association with the token identifier and the second-layer access restriction indicator.

3. The message processing server according to claim 2, wherein the message processor is further configured to:
receive from the first service provider server a data access request including the first authentication credential and the multi-layer token;
recover the token identifier and the second encrypted data layer from the multi-layer token;
confirm that the first authentication credential was saved in the memory in association with the recovered token identifier and the first-layer access restriction indicator prior to receiving the data access request;
determine the second cryptographic key from the recovered token identifier;
recover the first encrypted data layer by decrypting the second encrypted data layer with the determined second cryptographic key; and
return the first encrypted data layer to the first service provider server in response to the data access request.

4. The message processing server according to claim 2, wherein the message processor is further configured to:
receive from the second service provider server a data access request including the second authentication credential and the multi-layer token;
recover the token identifier and the second encrypted data layer from the multi-layer token;
confirm that the second authentication credential was saved in the memory in association with the recovered token identifier and the second-layer access restriction indicator prior to receiving the data access request; and
return the second encrypted data layer to the second service provider server in response to the data access request.

5. The message processing server according to claim 1, wherein the message processor is configured to return the multi-layer token and the first cryptographic key in response to the first encryption request.

6. The message processing server according to claim 1, wherein the message processor is configured to return the multi-layer token and the second cryptographic key in response to the second encryption request.

7. The message processing server according to claim 1, wherein the first encryption request includes the first cryptographic key and the first data, and the second encryption request includes the second cryptographic key and the second data.

8. The message processing server according to claim 1, wherein the message processor is configured to receive the first encryption request from a communications device via a communications network and the first service provider server, and to return the multi-layer token in response to the first encryption request by transmitting the multi-layer token to the communications device via the communications network and the first service provider server.

9. The message processing server according to claim 1, wherein the message processor is configured to receive the second encryption request from a communications device via the second service provider server, and to return the multi-layer token in response to the second encryption request by transmitting the multi-layer token to the communications device via the second service provider server.

10. The message processing server according to claim 1, wherein the message processor is configured to receive from an additional service provider server at least one additional encryption request subsequent to the second encryption request, each said additional encryption request including additional data and the multi-layer token, and, in response to each said additional encryption request, to:
   recover the token identifier and an outermost encrypted data layer from the multi-layer token;
   confirm that the recovered token identifier was saved in the memory in association with an access restriction indicator associated with the outermost encrypted data layer prior to receiving the additional encryption request;
   save the token identifier in the memory in association with an additional access restriction indicator and an additional cryptographic key, generate an additional encrypted data layer by encrypting the outermost encrypted data layer and the additional data with the additional cryptographic key, and regenerate the multi-layer token from the token identifier and the additional encrypted data layer, the additional access restriction indicator indicating access to the additional encrypted data layer is restricted to the additional service provider server; and
   return the multi-layer token to the additional service provider server in response to the additional encryption request.

11. A method performed by a message processor of a server of providing controlled access to data comprising:
   receiving from a first service provider server a first encryption request including first data and a first-layer access restriction indicator;
   saving a token identifier in association with the first-layer access restriction indicator and a first cryptographic key, generating a first encrypted data layer by encrypting the first data with the first cryptographic key, and generating a multi-layer token from the token identifier and the first encrypted data layer, the first-layer access restriction indicator indicating access to the first encrypted data layer is restricted to the first service provider server;
   returning the multi-layer token to the first service provider server in response to the first encryption request;
   receiving from a second service provider server a second encryption request including second data, the multi-layer token and a second-layer access restriction indicator, wherein the second service provider server is different than the first service provider server;
   recovering the token identifier and the first encrypted data layer from the multi-layer token;
   confirming that the recovered token identifier was saved in association with the first-layer access restriction indicator prior to receiving the second encryption request;
   saving the token identifier in association with the second-layer access restriction indicator and a second cryptographic key, generating a second encrypted data layer by encrypting the first encrypted data layer and the second data with the second cryptographic key, and regenerating the multi-layer token from the token identifier and the second encrypted data layer, the second-layer access restriction indicator indicating access to the second encrypted data layer is restricted to the second service provider server; and
   returning the multi-layer token to the second service provider server in response to the second encryption request.

12. The method according to claim 11, wherein:
   the first encryption request includes a first authentication credential associated with the first service provider server, and the second encryption request includes a second authentication credential associated with the second service provider server;
   the returning the multi-layer token in response to the first encryption request comprises saving the first authentication credential in association with the token identifier and the first-layer access restriction indicator; and
   the returning the multi-layer token in response to the second encryption response comprises saving the second authentication credential in association with the token identifier and the second-layer access restriction indicator.

13. The method according to claim 12, wherein the method further comprises:
   receiving from the first service provider server a data access request including the first authentication credential and the multi-layer token;
   recovering the token identifier and the second encrypted data layer from the multi-layer token;
   confirming that the first authentication credential was saved in the memory in association with the recovered token identifier and the first-layer access restriction indicator prior to receiving the data access request;
   determining the second cryptographic key from the recovered token identifier;
   recovering the first encrypted data layer by decrypting the second encrypted data layer with the determined second cryptographic key; and
   returning the first encrypted data layer to the first service provider server in response to the data access request.

14. The method according to claim 12, wherein the method further comprises:
   receiving from the second service provider server a data access request including the second authentication credential and the multi-layer token;
   recovering the token identifier and the second encrypted data layer from the multi-layer token;
   confirming that the second authentication credential was saved in association with the recovered token identifier and the second-layer access restriction indicator prior to receiving the data access request; and
   returning the second encrypted data layer to the second service provider server in response to the data access request.

15. The method according to claim 11, wherein the returning the multi-layer token in response to the first encryption response comprises returning the multi-layer token and the first cryptographic key in response to the first encryption request.

16. The method according to claim 11, wherein the returning the multi-layer token in response to the second encryption response comprises returning the multi-layer token and the second cryptographic key in response to the second encryption request.

17. The method according to claim 11, wherein the receiving a first encryption request comprises receiving the first cryptographic key and the first data, and the receiving a second encryption request comprises receiving the second cryptographic key and the second data.

18. The method according to claim 11, wherein the receiving a first encryption request comprises receiving the first encryption request from the first service provider server via a communications network, and the returning the multi-layer token in response to the first encryption request comprises transmitting the multi-layer token to the first service provider server via the communications network.

19. The method according to claim 11, wherein the receiving a second encryption request comprises receiving the second encryption request from a communications device via the second service provider server, and the returning the multi-layer token in response to the second encryption request comprise transmitting the multi-layer token to the communications device via the second service provider server.

* * * * *